(12) United States Patent
Breymeier et al.

(10) Patent No.: US 7,222,296 B2
(45) Date of Patent: May 22, 2007

(54) CONFIGURABLE DISPLAY OF WEB SITE CONTENT

(75) Inventors: Thomas Breymeier, Endwell, NY (US); Mark D. Smith, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 760 days.

(21) Appl. No.: 09/764,044

(22) Filed: Jan. 17, 2001

(65) Prior Publication Data

US 2002/0095455 A1 Jul. 18, 2002

(51) Int. Cl.
*G06F 15/00* (2006.01)
*G06F 17/00* (2006.01)

(52) U.S. Cl. .................. 715/513; 715/501; 715/505; 715/530; 709/200; 709/203

(58) Field of Classification Search ................ 709/217, 709/203; 719/311; 707/102, 10; 715/513, 715/762, 826, 501; 704/270
See application file for complete search history.

(56) References Cited

U.S. PATENT DOCUMENTS

| | | | | |
|---|---|---|---|---|
| 5,339,392 A | * | 8/1994 | Risberg et al. ............. 715/762 |
| 5,930,474 A | * | 7/1999 | Dunworth et al. .......... 709/217 |
| 5,983,227 A | * | 11/1999 | Nazem et al. ................ 707/10 |
| 5,999,664 A | | 12/1999 | Mahoney et al. |
| 6,006,242 A | | 12/1999 | Poole et al. |
| 6,026,433 A | * | 2/2000 | D'Arlach et al. ........... 709/217 |
| 6,061,696 A | * | 5/2000 | Lee et al. .................... 715/513 |
| 6,081,263 A | * | 6/2000 | LeGall et al. ............... 345/760 |
| 6,278,449 B1 | * | 8/2001 | Sugiarto et al. ............ 715/826 |
| 6,327,628 B1 | * | 12/2001 | Anuff et al. ................ 719/311 |
| 6,546,397 B1 | * | 4/2003 | Rempell ..................... 707/102 |
| 6,605,122 B1 | * | 8/2003 | Hearn et al. ................ 715/530 |
| 6,665,838 B1 | * | 12/2003 | Brown et al. ............ 715/501.1 |
| 6,766,298 B1 | * | 7/2004 | Dodrill et al. ........... 704/270.1 |
| 6,957,383 B1 | * | 10/2005 | Smith ...................... 715/501.1 |

* cited by examiner

*Primary Examiner*—Nathan J. Flynn
*Assistant Examiner*—Dustin Nguyen

(57) ABSTRACT

A method and system of displaying data from a database onto a page. The database is provided with a view having data therein, and with a configuration document describing characteristics of the page. The database is also provided with a form for reading the configuration document, for retrieving data from the view, and for placing the data on the page as described in the configuration document. A page address is formed from the names of the database and the form, and the page address is selected to display the data on the page. Preferably, a key is provided for locating the configuration documents, and this key may be provided when the page is accessed. Also, preferably, the view includes a multitude of data sets and the configuration document includes a multitude of instruction sets for displaying data on the page, and the method further includes the steps of selecting one of the data sets and one of the instruction sets, and displaying the selected data set on said page in accordance with the selected instruction set. More specifically, the data sets and the instruction sets may be listed on the form, and the step of selecting one of the data sets and one of the instruction sets preferably includes the step of identifying on the form the selected data sets and the selected instruction sets.

9 Claims, 7 Drawing Sheets

Screen from Dynamic View Generation Form

Screen from Sorted Notes View

| Title | Date Authored/Updated | Author |
|---|---|---|
| ◆ Maximizing Success: "The Application Framework for e-business" (Long Version) | 02/24/2000 | IBM |
| ◆ Maximizing Success: "The Application Framework for e-business" (Short Version) | 02/24/2000 | IBM |
| ◆ e-business at the Millennium | 02/09/2000 | Allison,Dave |
| ◆ Selling Through the Framework: Win e-business Opportunities | 02/08/2000 | Lord,John |
| ◆ Sell Through the Framework: Win e-business Opportunities! | 02/08/2000 | Allison,Dave |
| ◆ e-business Transformation and What It Really Takes | 11/11/99 | Swainson,John |

Fig. 4

Screen from Results on Web

Screen from CHANGED Configuration Document

Screen from CHANGED Results

CONFIGURABLE DISPLAY OF WEB SITE CONTENT

BACKGROUND OF THE INVENTION

1. Field of the Invention

This invention generally relates to web site management. More specifically, the invention relates to methods and systems for changing pages of web sites.

2. Prior Art

The contents of web sites are commonly managed by teams that are responsible for what and how documents are displayed. The displaying of documents available on many web sites is very dynamic and often requires changes to the core application design in order to accommodate this dynamic nature. For example, in many web sites, documents can be displayed according to different sort orders, the content can be displayed in single or double column format, and different text attributes such as type face and alignment may be used. Heretofore, making changes such as these required intervention by an application programmer.

SUMMARY OF THE INVENTION

An object of this invention is to improve methods and systems for configuring web pages.

Another object of the present invention is to provide the content needed for a web page in a single configurable document that may be accessed and analyzed by a management application in order to determine the content for the web page.

A further object of the present invention is to allow a content manager to make in real time changes to a web page that previously may have taken an application developer hours or days to implement.

These and other objects are attained with a method and system of displaying data from a database onto a page. The database is provided with a view having data therein, and with a configuration document describing characteristics of the page. The database is also provided with a form for reading the configuration document, for retrieving data from the view, and for placing the data on the page as described in the configuration document. A page address is formed from the names of the database and the form, and the page address is selected to display the data on the page.

Preferably, a key is provided for locating the configuration documents, and this key may be provided when the page is accessed. Also, preferably, the view includes a multitude of data sets and the configuration document includes a multitude of instruction sets for displaying data on the page, and the method further includes the steps of selecting one of the data sets and one of the instruction sets, and displaying the selected data set on said page in accordance with the selected instruction set. More specifically, the data sets and the instruction sets may be listed on the form, and the step of selecting one of the data sets and one of the instruction sets preferably includes the step of identifying on the form the selected data sets and the selected instruction sets.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 4 illustrates a screen from a sorted database view.

DETAILED DESCRIPTION OF THE PREFERRED EMBODIMENTS

Figure 1:
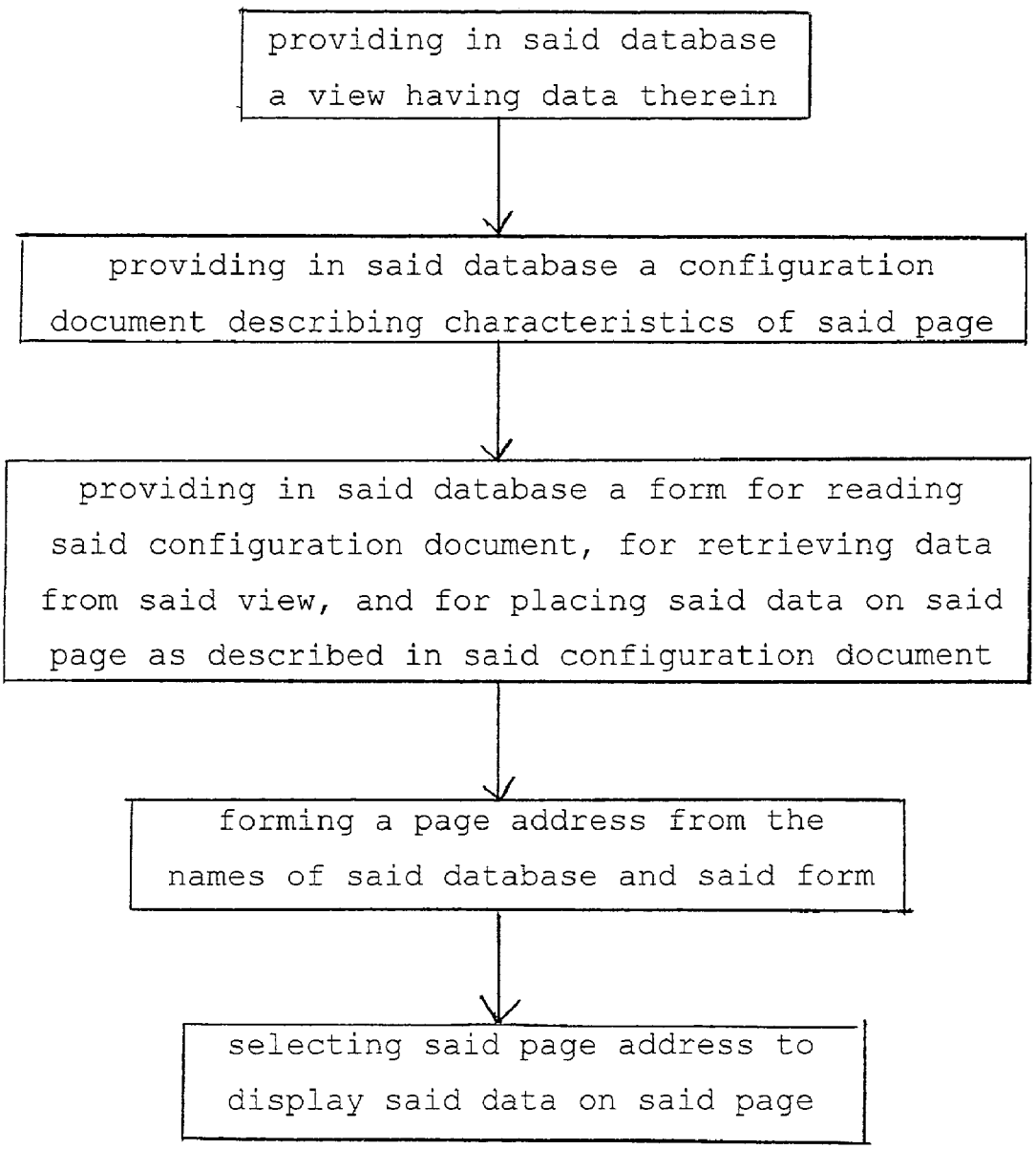
FIG. 1 generally indicates a preferred embodiment of carrying out the present invention.

With reference to FIG. 1, the present invention relates to a method and system of displaying data from a database onto a page. The database is provided with a view having data therein, and with a configuration document describing characteristics of the page. The database is also provided with a form for reading the configuration document, for retrieving data from the view, and for placing the data on the page as described in the configuration document. A page address is formed from the names of the database and the form, and the page address is selected to display the data on the page.

Figure 2:
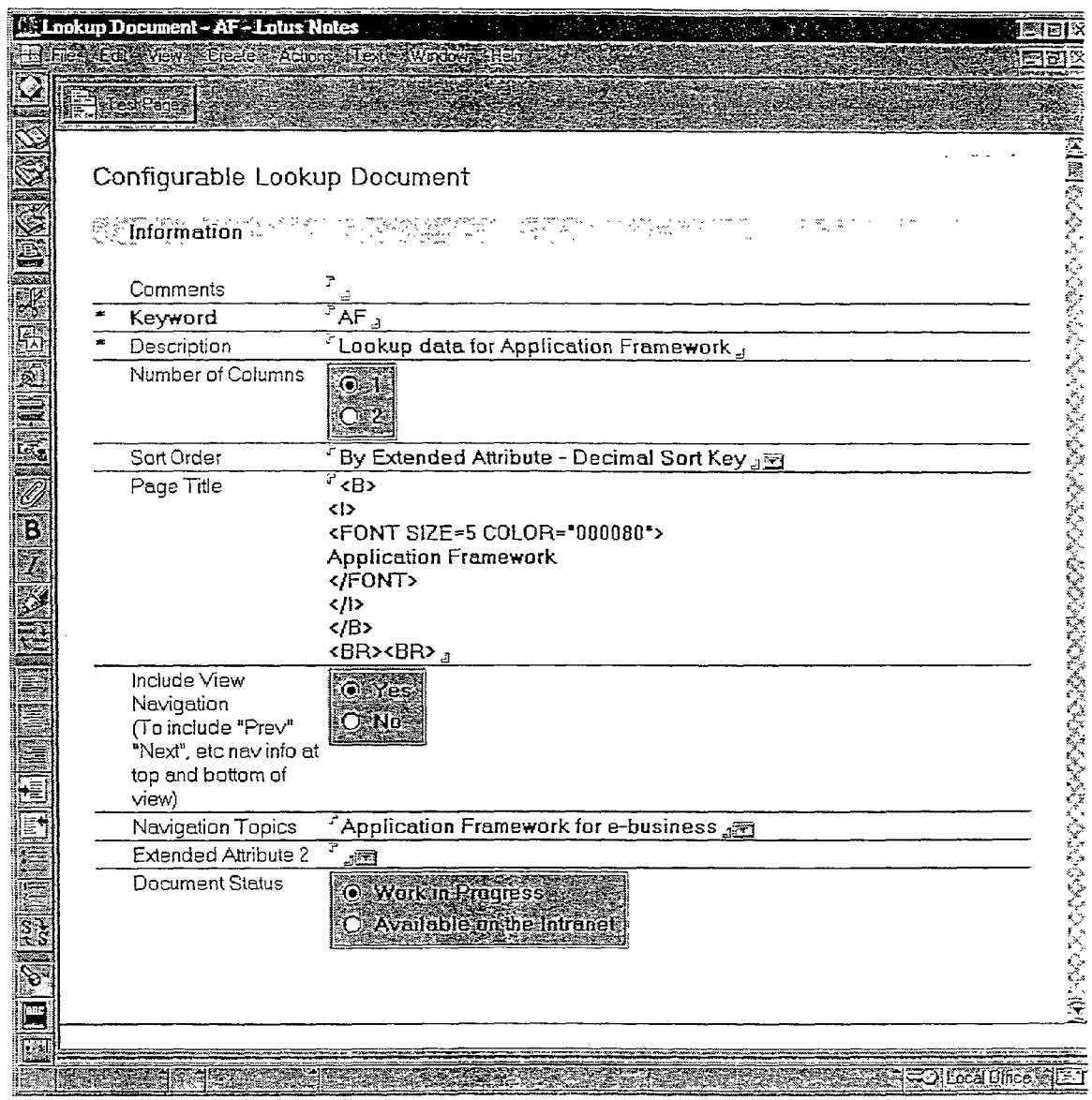
FIG. 2 shows a screen from a dynamic view configuration document.
Figure 3:
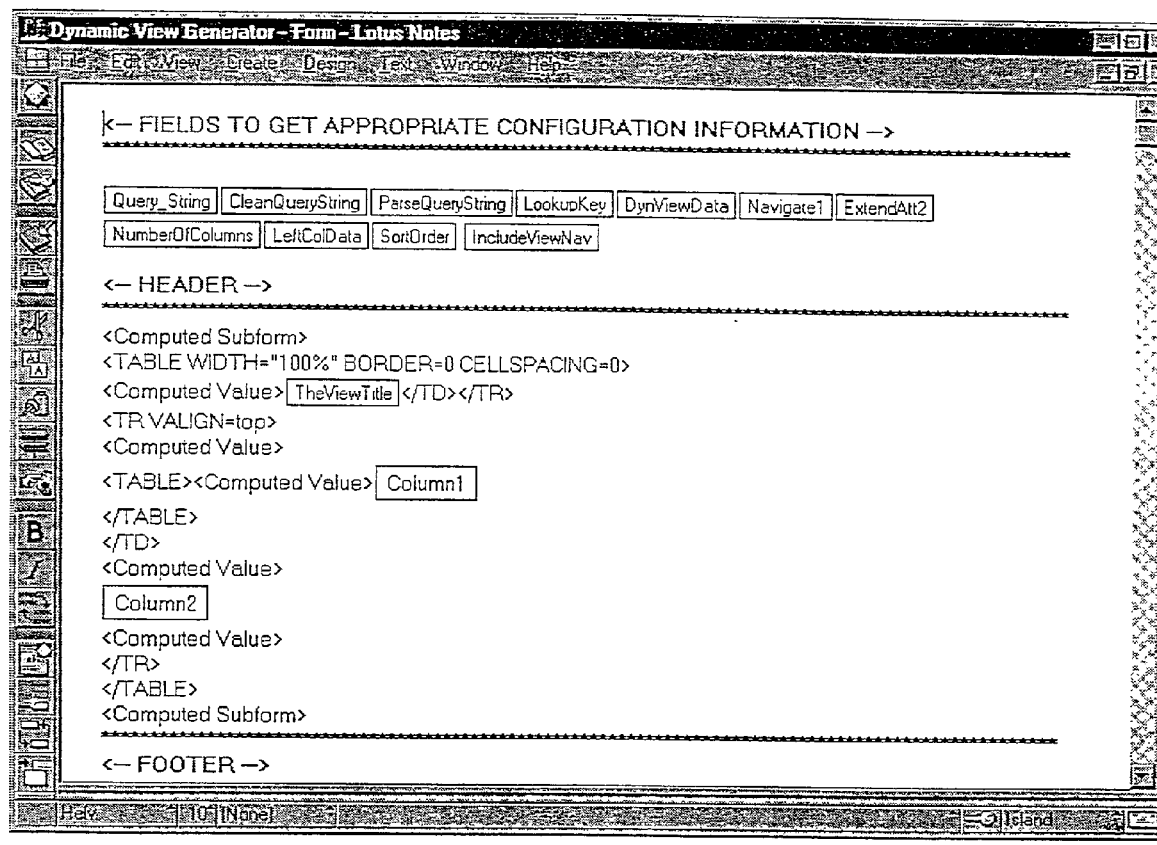
FIG. 3 shows a screen from a dynamic view generation form.
Figure 5:
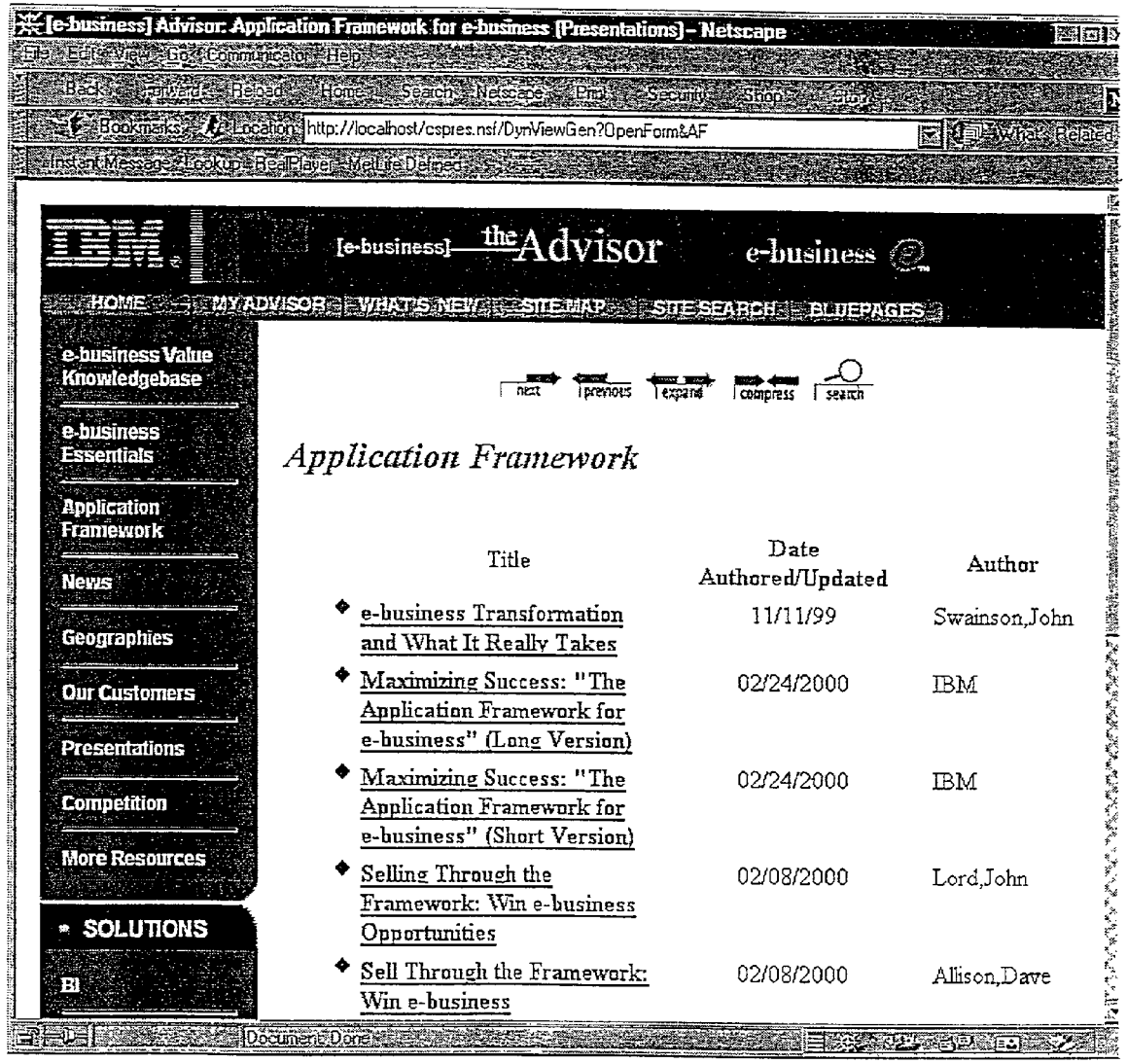
FIG. 5 depicts a screen from results on web.

With the preferred embodiment of the invention, once the configuration document is created, for example as shown in FIG. 2, then a specific form is used, for example as shown in FIG. 3, that looks up values describing the information to display. This form may be accessed via a Uniform Resource Locator (URL). The program then looks up into the appropriate Notes view, for instance using the screen depicted in FIG. 4, to get the content to display, resulting in a new web page, for example as illustrated in FIG. 5.

Figure 6:
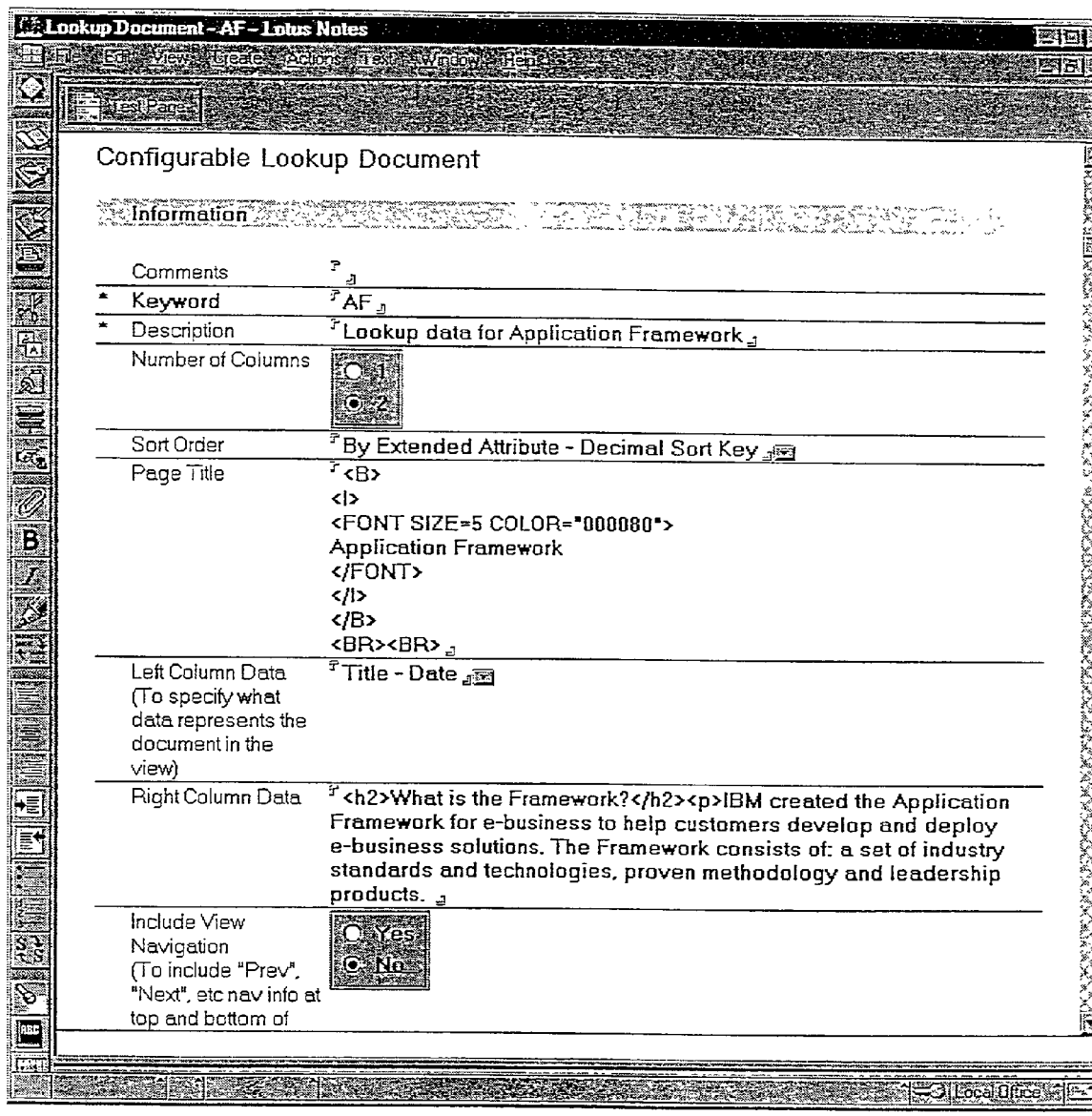
FIG. 6 shows a screen from changed configuration document.
Figure 7:
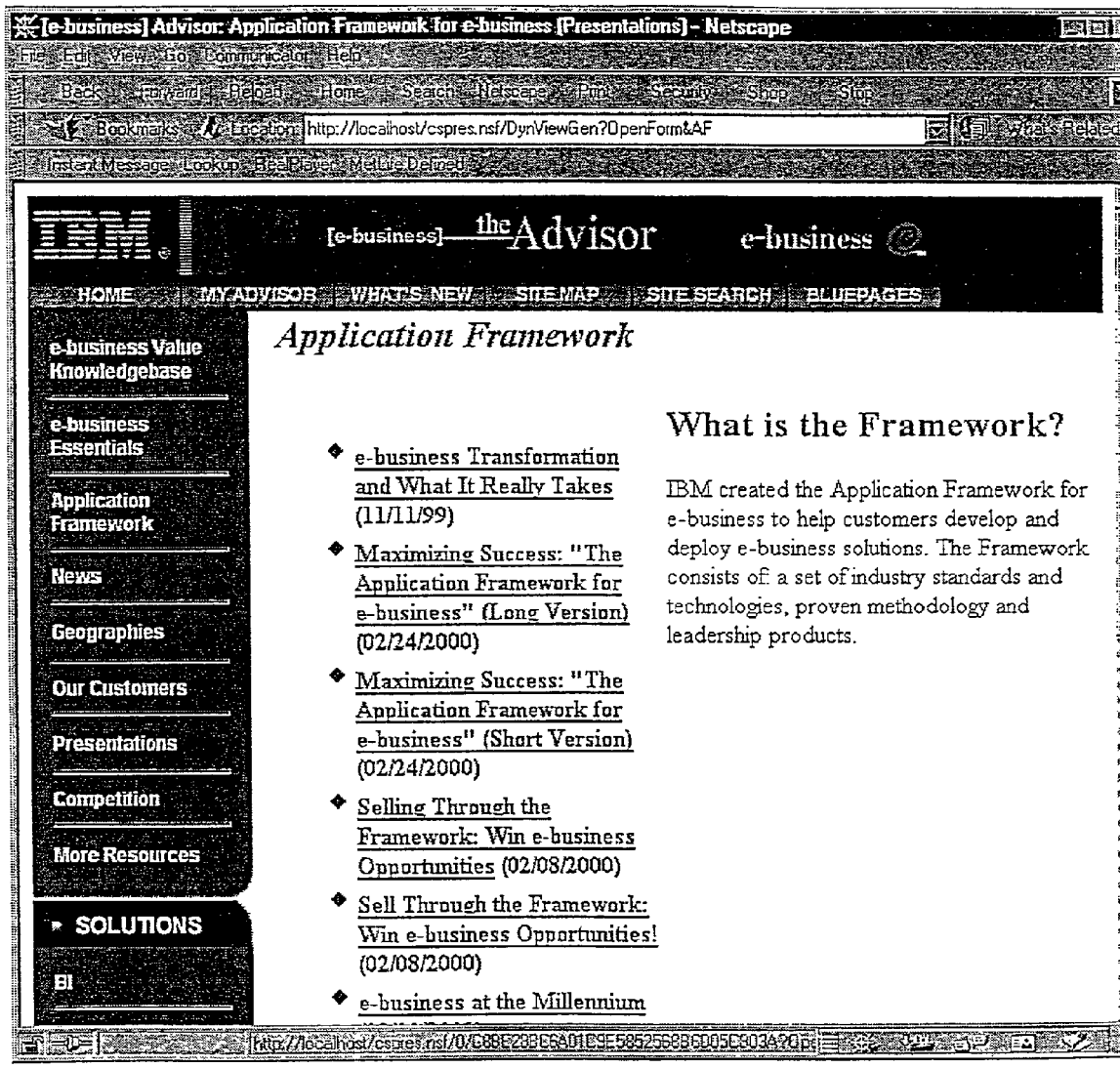
FIG. 7 shows a screen from changed results.

If the attributes need to be changed, then the configuration document is modified and saved, for instance as illustrated in FIG. 6. A page may be changed, as an example, to use two columns, adding a right column of data, with instructions to not include a view navigation. When the page is redisplayed, for example, as depicted in FIG. 7, it changes automatically, without intervention from an application programmer.

The present invention significantly simplifies making changes to web pages. When a web page that incorporates the preferred embodiment of the invention is accessed, a key is passed as a part of the Uniform Resource Locator (URL). This key is then used to locate a configurable document describing the page content. The configuration data are analyzed and displayed accordingly.

There are several scenarios that may occur after analyzing the data. HTML data may be generated dynamically according to settings defined in the document. Additional documents may be embedded into the document requested. User defined data from the configuration document may be displayed directly. All of these changed can be examined and test in real time by the person generating the content by changing the configuration document, saving it, and displaying the results in a browser.

It may be noted that while the preferred embodiment of the invention uses a Lotus Notes application platform, other suitable application platforms may also be used in the practice of this invention.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of generating a web page, said method comprising the steps of:
   generating a form document which indicates locations of data entries within said web page;
   generating a configuration document which indicates which of said data entries should be displayed on said web page, wherein there are more data entries indicated by said form document than indicated by said configuration document to be displayed on said web page;
   generating a data document which indicates said data entries;
   upon request by a user via a web browser to display said web page based on said form document, said data document and said configuration document, configuring said form document in accordance with said configuration document and entering said data entries from said data document into the respective indicated locations in the configured form document to generate said web page, said web page including said data entries indicated by said configuration document for display on said web page, said web page not including data entries indicated by said form document but not indicated by said configuration document for display on said web page, and displaying said web page; and further comprising the subsequent steps of:
   changing said configuration document, without changing said form document or said data document, to change which of said data entries should be displayed on said web page, and upon request by a user via a web browser to display a web page based on said form document, said data document and said changed configuration document, configuring said form document in accordance with said changed configuration document and entering said data entries from said data document into the respective indicated locations in the form document configured based on said changed configuration document to generate a web page based on said changed configuration document, and displaying said web page based on said changed configuration document.

2. A method as set forth in claim 1 wherein there are a plurality of requests by users via a web browser to display the first said web page based on said form document, said data document and the first said configuration document, and in response to each of said requests, further comprising the steps of dynamically configuring said form document in accordance with said first configuration document and dynamically entering said data entries from said data document into the respective indicated locations in the configured form document to dynamically generate said first web page, and displaying said first web page, such that said first web page is generated dynamically from said form document, said first configuration document and said data document for each of said plurality of requests.

3. A method as set forth in claim 1 wherein the first said configuration document and said changed configuration document are retained and usable after said subsequent steps, and further comprising the later steps of:
   upon request by a user via a web browser to display the first said web page based on said form document, said data document and said first configuration document, configuring said form document in accordance with said first configuration document and entering said data entries from said data document into the respective indicated locations in the configured form document to generate said first web page, said first web page including said data entries indicated by said first configuration document for display on said first web page, said first web page not including data entries indicated by said form document but not indicated by said first configuration document for display on said first web page, and displaying said first web page.

4. A system including computer storage media for generating a web page, said system comprising:
   means for generating a form document which indicates locations of data entries within said web page;
   means for generating a configuration document which indicates which of said data entries should be displayed on said web page, wherein there are more data entries indicated by said form document than indicated by said configuration document to be displayed on said web page;
   means for generating a data document which indicates said data entries;
   means, responsive to a request by a user via a web browser to display said web page based on said form document, said data document and said configuration document, for configuring said form document in accordance with said configuration document and entering said data entries from said data document into the respective indicated locations in the configured form document to generate said web page, said web page including said data entries indicated by said configuration document for display on said web page, said web page not including data entries indicated by said form document but not indicated by said configuration document for display on said web page, and initiating display of said web page; and
   means for subsequently changing said configuration document, without changing said form document or said data document, to change which of said data entries should be displayed on said web page, and upon request by a user via a web browser to display a web page based on said form document, said data document and said changed configuration document, configuring said form document in accordance with said changed configuration document and entering said data entries from said data document into the respective indicated locations in the form document configured based on said changed configuration document to generate a web page based on said changed configuration document, and initiating display of said web page based on said changed configuration document.

5. A system as set forth in claim 4 wherein there are a plurality of requests by users via a web browser to display the first said web page based on said form document, said data document and the first said configuration document, and further comprising, means, responsive to each of said requests, for dynamically configuring said form document in accordance with said first configuration document and dynamically entering said data entries from said data document into the respective indicated locations in the configured form document to dynamically generate said first web page, and initiating display of said first web page, such that said first web page is generated dynamically from said form document, said first configuration document and said data document for each of said plurality of requests.

6. A system as set forth in claim 4 wherein the first said configuration document and said changed configuration document are retained and reusable, and further comprising:

means, responsive to a subsequent request by a user via a web browser to display the first said web page based on said form document, said data document and said first configuration document, for configuring said form document in accordance with said first configuration document and entering said data entries from said data document into the respective indicated locations in the configured form document to generate said first web page, said first web page including said data entries indicated by said first configuration document for display on said first web page, said first web page not including data entries indicated by said form document but not indicated by said first configuration document for display on said first web page, and initiating display of said first web page.

7. A computer program product stored on a computer storage media for generating a web page, said computer program product comprising:

a computer readable media;

first program instructions to generate a form document which indicates locations of data entries within said web page;

second program instructions to generate a configuration document which indicates which of said data entries should be displayed on said web page, wherein there are more data entries indicated by said form document than indicated by said configuration document to be displayed on said web page;

third program instructions to generate a data document which indicates said data entries;

fourth program instructions, responsive to a request by a user via a web browser to display said web page based on said form document, said data document and said configuration document, to configure said form document in accordance with said configuration document and enter said data entries from said data document into the respective indicated locations in the configured form document to generate said web page, said web page including said data entries indicated by said configuration document for display on said web page, said web page not including data entries indicated by said form document but not indicated by said configuration document for display on said web page, and initiate display of said web page; and fifth program instructions to subsequently change said configuration document, without changing said form document or said data document, to change which of said data entries should be displayed on said web page, and upon request by a user via a web browser to display a web page based on said form document, said data document and said changed configuration document, to configure said form document in accordance with said changed configuration document and enter said data entries from said data document into the respective indicated locations in the form document configured based on said changed configuration document to generate a web page based on said changed configuration document and to initiate display of said web page based on said changed configuration document; and wherein said first, second, third, fourth and fifth program instructions are stored on said media in functional form.

8. A computer program product as set forth in claim 7 wherein:

there are a plurality of requests by users via web browsers to display the first said web page based on said form document, said data document and the first said configuration document; and said fourth program instructions are responsive to each of said requests to dynamically configure said form document in accordance with said first configuration document and dynamically enter said data entries from said data document into the respective indicated locations in the configured form document to dynamically generate said first web page, and initiate display of said first web page, such that said first web page is generated dynamically from said form document, said first configuration document and said data document for each of said plurality of requests.

9. A computer program product as set forth in claim 7 wherein:

the first said configuration document and said changed configuration document are retained and usable after said subsequent steps; and said fourth program instructions are responsive to a subsequent request by a user via a web browser to display the first said web page based on said form document, said data document and said first configuration document, to configure said form document in accordance with said first configuration document and enter said data entries from said data document into the respective indicated locations in the configured form document to generate said first web page, said first web page including said data entries indicated by said first configuration document for display on said first web page, said first web page not including data entries indicated by said form document but not indicated by said first configuration document for display on said first web page, and initiate display of said first web page.

* * * * *